United States Patent [19]
McFarland et al.

[11] 3,896,227

[45] July 22, 1975

[54] 1-(3-HYDROXYSTYRYL PYRIDINIUM SALTS AND THEIR DERIVATIVES AS WHIPWORM CONTROL AGENTS

[75] Inventors: James W. McFarland; Harold L. Howes, Jr., both of East Lyme, Conn.

[73] Assignee: Pfizer Inc., New York, N.Y.

[22] Filed: June 19, 1973

[21] Appl. No.: 371,370

Related U.S. Application Data

[62] Division of Ser. No. 169,087, Aug. 4, 1971, abandoned.

[52] U.S. Cl. ............................................... 424/263
[51] Int. Cl. ............................................ A61k 27/00
[58] Field of Search ..................................... 424/263

[56] References Cited
OTHER PUBLICATIONS
McFarland et al., J. Med. Chem., Vol. 12 (1969) pp. 1079–1086.

*Primary Examiner*—V. D. Turner
*Attorney, Agent, or Firm*—Connolly and Hutz

[57] ABSTRACT

The preparation and anthelmintic properties of certain 1-(3-hydroxystyryl)pyridinium salts and derivatives thereof against whipworm are described.

4 Claims, No Drawings

1-(3-HYDROXYSTYRYL) PYRIDINIUM SALTS AND THEIR DERIVATIVES AS WHIPWORM CONTROL AGENTS

CROSS REFERENCE TO RELATED APPLICATION

This application is a division of application Ser. No. 169,087 filed Aug. 4, 1971 and now abandoned.

BACKGROUND OF THE INVENTION

This invention relates to 1-(3-hydroxystyryl)-pyridinium salts and derivatives thereof and their use as anthelmintic agents in controlling whipworm. More particularly, it relates to 1-(3-hydroxystyryl)pyridinium salts and the corresponding ethers and esters thereof which are of value in the control of helminthiasis caused by whipworm.

Helminthiasis, the infection of the animal body, and particularly the gastrointestinal tract, by various species of parasitic worms, is perhaps the economically most significant disease in the world today. Particularly difficult to treat, because of their position in the cecum and large intestine, are whipworms (suborder Trichurata, genus Trichuris). The whipworm of man, *Trichuris trichiura*, infects 475,000,000 persons in the world, while the other trichurid species infect an enormous number of mammalian species including both ruminants (e.g., sheep, cattle, goats) and non-ruminants such as dogs, cats, horses and swine.

Activity of anthelmintic cyclic amidines, including the broad spectrum anthelmintic agent pyrantel, against *N. dubius* is reported by McFarland, et al., J. Med. Chem., 12, 1066 (1969) and against the same helminth using a series of 1-(2-arylvinyl)pyridinium salts, McFarland and Howes, J. Med. Chem., 12, 1079 (1969), while activity of these agents against helminths belonging to the genus Trichinella of the suborder Trichurata is disclosed, no activity against trichurids is described.

SUMMARY OF THE INVENTION

According to the present invention it has now been unexpectedly found that 1-(3-hydroxystyryl)-pyridinium salts and certain derivatives thereof having the formula:

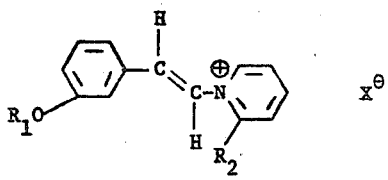

wherein $R_1$ is selected from the group consisting of hydrogen, methyl, alkanoyl containing from 1 to 4 carbon atoms, alkoxycarbonyl containing from 2 to 5 carbon atoms and benzoyl and substituted benzoyl wherein said substituent is selected from the group consisting of fluorine, chlorine, trifluoromethyl, methoxy and methyl; $R_2$ is hydrogen or methyl; and X is an anion of a pharmaceutically acceptable salt, are outstandingly effective against whipworm in mammals, including humans, when administered orally or parenterally.

The novel compounds of the present invention include those of the above formula wherein $R_1$ is selected from the group consisting of alkanoyl containing from 1 to 4 carbon atoms, alkoxycarbonyl containing from 2 to 5 carbon atoms and benzoyl and substituted benzoyl wherein said substituent is selected from the group consisting of fluorine, chlorine, trifluoromethyl, methoxy and methyl; $R_2$ is hydrogen or methyl; and X is an anion of a pharmaceutically acceptable salt.

Those compounds wherein $R_1$ is hydrogen or methyl and $R_2$ and X are, as previously indicated, not new and are reported by McFarland and Howes, J. Med. Chem., 12, 1079 (1969), to have only moderate activity against *N. dubius* and *S. obvelata*. The lack of significant activity against these helminths makes their outstanding activity against whipworm even more surprising. Additionally, many arylvinylpyridinium compounds found by McFarland and Howes to be broad spectrum anthelmintic agents have little effect in the treatment of whipworm.

By the above-employed term "anion of a pharmaceutically acceptable salt" is meant those anions which as salts have no toxicity associated with their use at the dosages administered. Such anions include chloride, bromide, phosphate, nitrate, sulfate, acetate, hexafluorophosphate, citrate, gluconate, benzoate, propionate, butyrate, sulfosalicylate, maleate, laurate, malate, fumarate, succinate, tartrate, amsonate, pamoate and p-toluenesulfonate.

Of particular interest among the congeners of the present invention are those compounds wherein $R_2$ is hydrogen, X is bromide and $R_1$ is selected from the group consisting of hydrogen, methyl, alkanoyl containing from 1 to 4 carbon atoms and benzoyl.

Also included within the purview of the present invention are compounds of the above formula wherein $R_2$ and X are as previously indicated and $R_1$ is selected from the group consisting of benzyl and mono- and disubstituted benzyl wherein said substituents are those which are commonly found on aromatic rings.

DETAILED DESCRIPTION OF THE INVENTION

The novel products of the present invention are prepared by reacting 1-(3,β-dihydroxyphenethyl)-pyridinium bromide with an appropriate benzoyl-, alkanoyl- or alkoxycarbonyl halide or the corresponding acid anhydride as shown in the following reaction scheme:

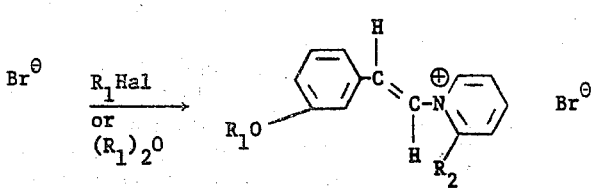

wherein $R_1$ and $R_2$ are as previously indicated and Hal is a halogen, e.g., chloride or bromide.

In practice, 1-(3,β-dihydroxyphenethyl)pyridinium bromide is contacted with the appropriate halide or anhydride under conditions wherein a large excess of the halide or anhydride serves as both reactant and solvent. In general, a weight ratio of approximately 1:5 is employed without markedly affecting the course of the reaction. When reaction temperatures of from 50°–250° C. are employed reaction times of 3–24 hours are adequate to provide the desired products.

The product is isolated by hydrolysis of the reaction mixture followed by filtration of the product. In instances wherein the product possesses high water solubility the hydrolyzed reaction mixture is concentrated in volume prior to filtration. Alternately, the excess acid halide or anhydride can be removed under reduced pressure and the residue subsequently treated with water and the product filtered. Purification of the final product is carried out by recrystallization from an appropriate solvent.

The known compounds of the present invention wherein $R_2$ and X are as previously described and $R_1$ is hydrogen or methyl, as well as the requisite starting material, 1-(3,β-dihydroxyphenethyl)pyridinium bromide, for the novel products of this invention, are synthesized according to the methods reported by McFarland and Howes, J. Med. Chem., 12, 1079 (1969).

The requisite halides and anhydrides are either commercial reagents or are conveniently prepared by methods known to those skilled in the art; alkoxycarbonyl halides by the method of Verbiscar et al., J. Med. Chem., 13, 1176 (1970) and benzoyl and alkanoyl halides and anhydrides according to the methods outlined by Wagner and Zook, "Synthetic Organic Chemistry," John Wiley and Sons, Inc., New York, New York, 1956, Chapter 17, page 546 and Chapter 18, page 558.

As one skilled in the art can readily appreciate, dehydration of the β-hydroxyethyl moiety of the starting material, during synthesis of the products of the present invention, gives rise to a vinylpyridinium salt which, theoretically can exist in the cis or trans configuration as shown:

of the halide anion using one equivalent of the silver salt of the acid whose anion is to become the anion of the quaternary salt. The precipitated silver chloride or bromide is filtered or centrifuged and the aqueous solution or supernatant is concentrated to dryness in vacuo. For example, an aqueous solution of a pyridinium halide is treated with one equivalent of silver nitrate dissolved in water; the resultant silver halide is filtered and the aqueous solution concentrated under reduced pressure to provide the corresponding pyridinium nitrate. As one skilled in the art can appreciate, other methods can be employed in order to effect anion exchange. The preferred anion, X, of the compounds of the present invention is the bromide ion.

As previously indicated, the pyridinium salts of the present invention are readily adapted to therapeutic use for the control of whipworm in mammals. Outstanding for their effectiveness are included the following agents: trans-1-(3-hydroxystyryl)pyridinium bromide, trans-1-(3-methoxystyryl)pyridinium bromide, trans-1-(3-benzyloxystyryl)pyridinium bromide and trans-1-(3-acetoxystyryl)pyridinium bromide.

As noted above, these products are effective to a significant degree in controlling, that is, in eliminating and preventing, helminthiasis caused by whipworm in mammals, including man, by both the oral and parenteral routes of administration. The terms "controlling" and "control" as used herein are meant to include the treatment of helminthiasis caused by whipworm in mammals, including man, suffering therefrom and the prevention (prophylaxis) of helminthiasis caused by whipworm in mammals, including man. Subcutaneous and intramuscular injections are the preferred methods of parenteral injection for domestic animals for several reasons: simplicity, convenience and the compounds appear less toxic. Vehicles suitable for parenteral injection may be either aqueous such as water, isotonic saline, isotonic dextrose, Ringer's solution, or non-aqueous such as fatty oils of vegetable origin (cottonseed, peanut oil, corn, sesame) and other non-aqueous vehicles which will not interfere with the therapeutic efficiency of the preparation and are non-toxic in the volume or proportion used (glycerol, propylene glycol,

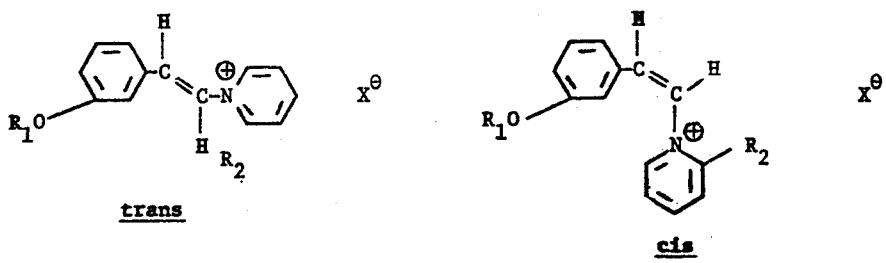

trans        cis

Employing the methods utilized by McFarland and Howes, J. Med. Chem., 12,1079 (1969), it has been ascertained that the novel compounds of the present invention are of the trans, and more thermodynamically stable, configuration and are depicted as such herein.

As has been previously mentioned, a characteristic feature of the products of this invention is that they are quaternary salts, the anion of which can be varied. Salts containing said anions, X, can be conveniently prepared from the corresponding pyridinium chloride or bromide salts by a method which employs precipitation sorbitol). Additionally, compositions suitable for extemporaneous preparation of solutions prior to administration man advantageously be made. Such compositions may include liquid diluents, for example, propylene glycol, diethyl carbonate, glycerol, sorbitol, etc., buffering agents, as well as local anesthetics and inorganic salts to afford desirable pharmacological properties. Administration of these anthelmintic agents in combination with hyaluronidase avoids local irritation and increases the rate of absorption of the drug. Hyaluronidase levels of at least about 150 (U.S.P.) units are very effective in this respect although higher or lower levels can, of course, be used.

When administered parenterally for therapeutic purposes the anthelmintic agents described herein or their non-toxic acid addition salts are administered in a dosage equivalent to from about 5 mg. to about 250 mg. of the pyridinium hydroxide/kg. of body weight.

When administered by the oral route, the preferred route, especially in man, the compounds are given in dosages equivalent to from about 0.5 mg. to about 150 mg. of pyridinium hydroxide/kg. of body weight. For therapeutic use a dosage equivalent to about 1 mg. to 100 mg. of pyridinium hydroxide/kg. of body weight is recommended. Oral administration to mammals other than man can readily be accomplished by a number of methods including mixing with the feed, unit dosage formulations such as capsules, tablets, liquid mixtures and solutions including drench solutions. Solutions having concentrations ranging from about 3% up to the limit of solubility of the salt in water are satisfactory for drench solutions. More dilute solutions can, however, be supplied for drinking purposes. Alternatively, wettable powder containing the active ingredient may be added to the animal's drinking water.

For prophylatic use, 0.5 to 50 mg. (calculated as pyridinium hydroxide) per kg. of body weight daily is administered. This is the preferred range. Higher dosages can, of course, be used but are not desirable from an economic standpoint. The above methods of administration are suitable although administration in the animal's food, water, or mineral mixture is more convenient.

Boluses and capsules are also used for the therapeutic treatment of animals. For animals weighing from 30 to 1000 pounds the usual dose, calculated as pyridinium hydroxide, ranges from 0.1 to 45 grams. Boluses of suitable sizes containing these materials can be prepared by conventional methods.

Dry mineral mixtures containing the products of this invention at levels of from 0.001 to about 10% of the active ingredient mixed with salt (sodium chloride) and other minerals can be fed the animals on an *ad libitum* basis by adjusting the proportion of active ingredient in the mixture to the average daily consumption per animal so as to provide the proper daily dose as specified above. If prepared feed supplements are employed, the material can be administered in admixture with the feed. Again, a concentration range of about 0.001 to 10% of the drug in the feed is employed. However, higher proportions can product to satisfactorily employed depending upon the palatability of the productto the animal. Additionally, these compounds can be used in micronized form especially when used in emulsions or suspensions by either the oral or parenteral route of administration.

The effectiveness of trans-1-(3-hydroxystyryl)-pyridinium bromide against *Trichuris muris, Nematospiroides dubius, Hymenolepsis nana* and *Syphacia obvelata* is demonstrated by the activity data in Table I. The test compound is directly administered orally in a single dose to mice infected separately with all four species of helminths, and the MED (minimum effective dose which achieves at least 90% reduction in the worm burden as compared to untreated infected control) determined.

TABLE I.

| Single Dose mg./kg. | Average Percent Reduction (4 to 8 mice/group) | | | |
|---|---|---|---|---|
| | H. nana | N. dubius | S. obvelata | T. muris |
| 250 | <25 | 97 | 100 | — |
| 62 | <25 | 22 | <25 | 100 |
| 16 | — | — | — | 100 |
| 8 | — | — | — | 92 |
| 2 | — | — | — | 72 |
| MED | >250 | 250 | 250 | 8 |

The high degree of specificity of trans-1-(3-hydroxystyryl)pyridinium bromide for mouse whipworm *T. muris*, compared with its moderate activity against other helminths is shown by the data in Table I. All the compounds of the present invention demonstrate outstanding activity against whipworm (Trichuris spp.) and a high degree of specificity therefor.

When trans-1-(3-methoxystyryl)pyridinium bromide is tested against the same helminths indicated in Table I, the MED values found for *H. nana, N. dubius, S. obvelata* and *T. muris* are >250 mg./kg., >250 mg./kg., >250 mg./kg., and 50 mg./kg., respectively. Again, the above described activity demonstrates the specificity and effectiveness of this compound for whipworm helminths.

The following examples are provided solely for the purpose of illustration.

EXAMPLE 1 trans-1-(3-Benzoyloxystyryl)pyridinium bromide

To 50 ml. of benzoyl chloride is added 9.5 g. (0.032 mole) of 1-(3,β-dihydroxyphenethyl)pyridinium bromide and the resulting solution heated at 200° C. for 16 hours. The reaction is allowed to stand for several days at room temperature and is then poured into 500 ml. of water. Two grams of crude product is filtered and the filtrate concentrated under reduced pressure to afford a second crop of impure product (2.0 g.). Both crops are combined and recrystallized from acetonitrile, 3.7 g., m.p. 179°–181° C.

Anal. Calcd for C$_{20}$H$_{18}$BrNO$_2$: C, 62.8; H, 4.2; N, 3.7.
Found: C, 62.6; H, 4.3; N, 3.5.

When tested for effectiveness against *T. muris*, the trans-1-(3-benzoyloxystyryl)pyridinium bromide has an MED value of 8 mg./kg.

EXAMPLE 2

Starting with 1-(3,β-dihydroxyphenethyl)pyridinium- or 1-(3,β-dihydroxyphenethyl)-2-methylpyridinium bromide and the requisite benzoyl halide and following the procedure of Example 1, the following compounds are prepared:

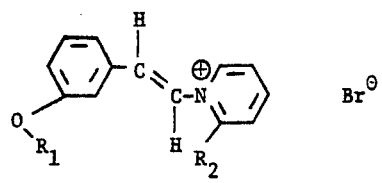

| $R_1$ | $R_2$ | $R_1$ | $R_2$ |
|---|---|---|---|
| o—$FC_6H_4CO$ | H | o—$FC_6H_4CO$ | $CH_3$ |
| p—$FC_6H_4CO$ | H | m—$FC_6H_4CO$ | $CH_3$ |
| o—$ClC_6H_4CO$ | H | p—$FC_6H_4CO$ | $CH_3$ |
| m—$ClC_6H_4CO$ | H | o—$ClC_6H_4CO$ | $CH_3$ |
| m—$CF_3C_6H_4CO$ | H | p—$ClC_6H_4CO$ | $CH_3$ |
| p—$CF_3C_6H_4CO$ | H | p—$CF_3C_6H_4CO$ | $CH_3$ |
| o—$CH_3C_6H_4CO$ | H | o—$CH_3C_6H_4CO$ | $CH_3$ |
| m—$CH_3C_6H_4CO$ | H | p—$CH_3C_6H_4CO$ | $CH_3$ |
| p—$CH_3C_6H_4CO$ | H | o—$CH_3OC_6H_4CO$ | $CH_3$ |
| o—$CH_3OC_6H_4CO$ | H | m—$CH_3OC_6H_4CO$ | $CH_3$ |
| p—$CH_3OC_6H_4CO$ | H | p—$CH_3OC_6H_4CO$ | $CH_3$ |

EXAMPLE 3 trans-1-(3-Acetoxystyryl)pyridinium bromide

A mixture of 2.9 g. (0.01 mole) of 3-(3,β-dihydroxyphenethyl)pyridinium bromide in 10 ml. of acetic anhydride is heated in a steel bomb for 5 hours at 220° C. The reaction mixture is cooled, added to 100 ml. of water and extracted several times with ethyl acetate. The aqueous layer is concentrated under reduced pressure and subsequently cooled in an ice bath. The resulting precipitate is collected by filtration, dried at an oven temperature and finally, recrystallized from acetonitrile.

In a similar manner, the following congeners are synthesized, starting with 1-(3,β-dihydroxyphenethyl)-pyridinium- or 1-(3,β-dihydroxyphenethyl)-2-methylpyridinium bromide and the appropriate alkanoic anhydride:

trans-1-(3-acetoxystyryl)-2-methylpyridinium bromide, trans-1-(3-propionyloxystyryl)pyridinium bromide, trans-1-(3-butyryloxystyryl)pyridinium bromide, trans-1-(3-butyryloxystyryl)-2-methylpyridinium bromide, trans-1-(3-isobutyloxystyryl)pyridinium bromide and trans-1-(3isobutyryloxystyryl)-2-methylpyridinium bromide.

EXAMPLE 4 trans-1-(3-Ethoxycarbonyloxystyryl)-2-methylpyridinium hexafluorophosphate

To 35 ml. of ethyl chloroformate is added 6.2 g. (0.02 mole) of 1-(3,β-dihydroxyphenethyl)-2-methylpyridinium bromide and the resulting mixture heated at 90°–95° C. for 24 hours. The reaction mixture is cooled to room temperature, hydrolyzed with 200 ml. of water and extracted several times with ethyl acetate. The aqueous layer is separated, evaporated in vacuo to one-half volume and treated with 5.5 ml. of 65% hexafluorophosphoic acid. The crystalline product which precipitates from the stirred solution is filtered and recrystallized from ethanol.

EXAMPLE 5

Starting with either 1-(3,β-dihydroxyphenethyl)-pyridinium bromine or the corresponding 2-methyl homolog and the appropriate alkyl chloroformate, and following the procedure of Example 4, the following products are prepared:

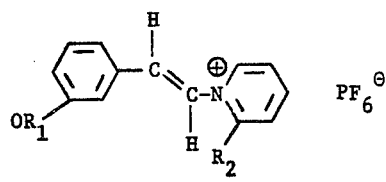

| $R_1$ | $R_2$ | $R_1$ | $R_2$ |
|---|---|---|---|
| $CH_3OCO$ | H | $CH_3OCO$ | $CH_3$ |
| n—$C_3H_7OCO$ | H | n—$C_3H_7OCO$ | $CH_3$ |
| i—$C_3H_7OCO$ | H | i—$C_3H_7OCO$ | $CH_3$ |
| n—$C_4H_9OCO$ | H | n—$C_4H_9OCO$ | $CH_3$ |
| s—$C_4H_9OCO$ | H | s—$C_4H_9OCO$ | $CH_3$ |
| $C_2H_5OCO$ | H | t—$C_4H_9OCO$ | $CH_3$ |

EXAMPLE 6 trans-1-(3-Benzoyloxystyryl)pyridinium Nitrate

A solution of 3.8 g. (0.01 mole) of trans-1-(3-benzoyloxystyryl)pyridinium bromide in 40 ml. of warm water is treated with 1.7 g. (0.01 mole) of silver nitrate and the resulting suspension is allowed to stir for fifteen minutes. The suspension is centrifuged and the supernatant, which is decanted away from the solids, is concentrated to dryness under reduced pressure and the residual product recrystallized from acetonitrile.

In a similar manner, employing the appropriate acid and pyridinium salt, the products of Examples 1–3 are converted to the following salts:

p-toluene-sulfonate, pamoate, amsonate, laurate, citrate, gluconate, benzoate, acetate, propionate, butyrate, sulfate, nitrate, phosphate, bromide, chloride, hexafluorophosphate, trimethylacetate, succinate, malate, tartrate and fumarate.

EXAMPLE 7

A. Tablets and Boluses

A convenient tablet size is one containing 250 mg. of the drug. Such tablets can be prepared by thoroughly blending 250 g. of trans-1-(3-hydroxystyryl)pyridinium bromide or the equivalent weight of other compound within the scope of this invention and 50 g. of starch in a twin shell blender. The blended powders are then mixed with sufficient ethanol to make an easily manipulated paste which is extruded through a 10-mesh screen to provide granules which are dried in vacuo until all the solvent is removed. The granules are coated with magnesium stearate by briefly blending with 2% the total weight of granules of that substance. This mixture is then fed to a tableting press to produce tablets containing 250 mg. of anthelmintic agent in addition to proportionate quantities of the carriers and excipients listed above. For animals, the daily dose varies from 0.01 to 45 g. per day depending again upon the body weight of the animal. Boluses of various sizes can be prepared in the same fashion by simply selecting a die of appropriate size.

B. Capsules

The products of this invention can be conveniently encapsulated in hard gelatin capsules. For therapeutic and prophylactic purposes, from about 10 mg. to 1 gram of these agents can be contained in a single capsule. It is convenient to mix the active ingredient with a solid diluent, for instance, calcium phosphate. From about 15 to 50% the weight of drug of tricalcium phosphate is employed. Thus a hard gelatin capsule can be prepared by thoroughly blending two parts by weight of trans-1-(3-benzoyloxystyryl)pyridinium bromide and calcium phosphate in a twin shell blender. The powder is then subdivided, and loaded into hard gelatin capsules in such a fashion that each capsule contains 250 mg. active ingredient.

EXAMPLE 8

Mineral Mixture

Such a mixture can be conveniently made by mixing trans-1-(3-hydroxystyryl)pyridinium chloride equivalent to 1 part by weight of pyridinium hydroxide, with 19 parts by weight of the usual granular stock of salt (sodium chloride). The mixture is thoroughly blended and fed to the animals in such quantities as to provide the recommended daily dose. Such salt mixtures can also be incorporated into block form but this is not preferred due to lack of control of the dosage size received by the animals.

In like manner mineral mixtures of the other products within the ambit of this invention can be prepared.

EXAMPLE 9

Feed Mixture

Prophylactic use of these products can be properly accomplished by adding the agent to a feed mixture. The usual prophylactic dose is from about 2.5 to 25 g. (calculated as pyridinium hydroxide) daily for 1000 pound cattle. Assuming such animal consumes 10 lbs. of feed supplement per day, at least 10 lbs. of the chosen agent per ton would be incorporated. Depending upon the feed consumption of the animal and the dosage employed, the proportion of agent in the feed varies from 0.001% up to about 10% on a weight basis.

What is claimed is:

1. A method for treating a whipworm infected mammal which comprises orally or parenterally administering to said whipworm infected mammal a whipworm burden reducing amount of a compound selected from the group consisting of trans-1-(3-hydroxystyryl)-pyridinium bromide, trans-1-(3-methoxystyryl)-pyridinium bromide and trans-1-(3-benzoyloxystyryl)-pyridinium bromide.

2. The method of claim 1 wherein the selected compound is trans-1-(3-hydroxystyryl)pyridinium bromide.

3. The method of claim 1 wherein the selected compound is trans-1-(3-methoxystyryl)pyridinium bromide.

4. The method of claim 1 wherein the selected compound is trans-1-(3-benzoyloxystyryl)pyridinium bromide.

* * * * *